(12) United States Patent
Chan

(10) Patent No.: US 7,383,651 B2
(45) Date of Patent: Jun. 10, 2008

(54) MOTION DISPLAYING PHOTO FRAME

(75) Inventor: Tommy Wai Ming Chan, Kowloon (HK)

(73) Assignee: Lightbox Effects Limited, Kowloon (HK)

( * ) Notice: Subject to any disclaimer, the term of this patent is extended or adjusted under 35 U.S.C. 154(b) by 473 days.

(21) Appl. No.: 10/929,558

(22) Filed: Aug. 31, 2004

(65) Prior Publication Data

US 2006/0042136 A1    Mar. 2, 2006

(51) Int. Cl.
*G09F 19/00* (2006.01)
(52) U.S. Cl. .......................................... 40/436; 40/454
(58) Field of Classification Search .................. 40/454, 40/437, 436
See application file for complete search history.

(56) References Cited

U.S. PATENT DOCUMENTS

| 6,219,948 B1 | 4/2001 | Bar-Yona | |
| 6,624,947 B2* | 9/2003 | McKinley | 359/619 |
| 2003/0014890 A1* | 1/2003 | Bar-Yona | 40/454 |
| 2003/0103351 A1* | 6/2003 | Privas et al. | 362/276 |
| 2004/0231206 A1* | 11/2004 | Liebman et al. | 40/453 |

FOREIGN PATENT DOCUMENTS

| JP | 2003295805 A | * 10/2003 |
| JP | 2004070259 A | * 3/2004 |

* cited by examiner

*Primary Examiner*—Cassandra Davis
(74) *Attorney, Agent, or Firm*—Rabin & Berdo, P.C.

(57) ABSTRACT

A motion displaying photo frame includes a frame with a rear plate, an insertion groove, a lenticluar raster, a photo paper and a driving unit having an eccentric wheel. An opening or notch is provided on the lower portion of the raster. The raster can be mounted in the frame through the insertion grooves and can be moved up and downward or left and rightward. The photo paper can be inserted into the frame through inserting grooves and located between the raster and the rear plate. The eccentric wheel can be inserted into the opening or notch of the raster which can be moved up and downward or left and rightward through the actuation of the driving unit. The fine details of each of two or more constituent images can be viewed with clarity as compared with a conventional photo paper.

11 Claims, 6 Drawing Sheets

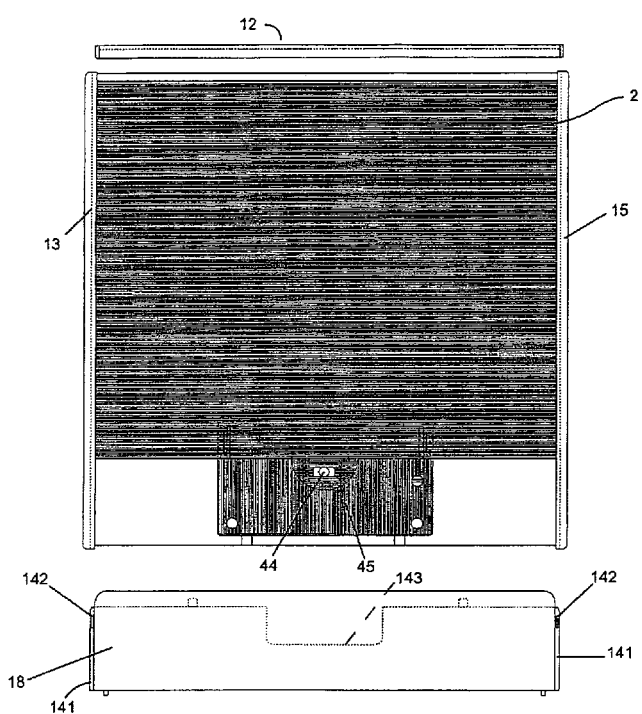
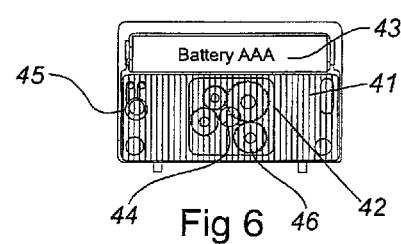
Fig 6
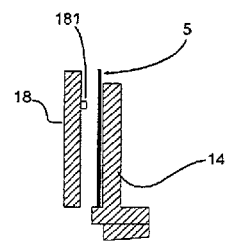
Fig 5
Fig 7

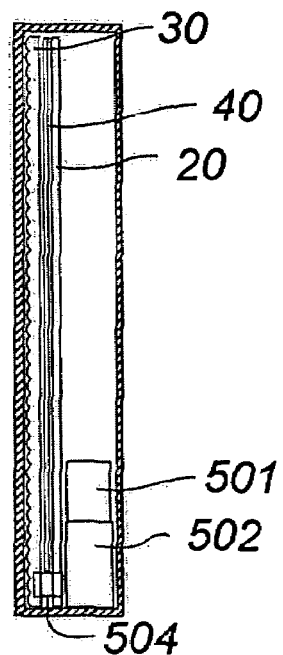
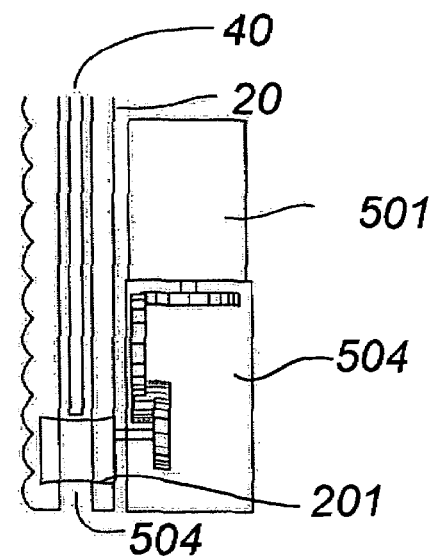
Fig 12  Fig 15
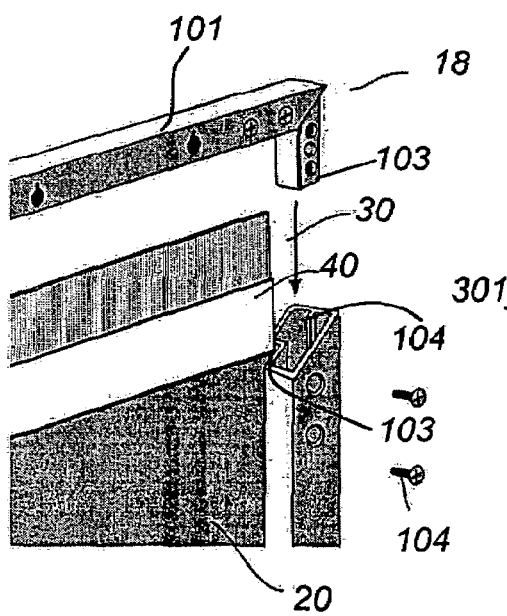
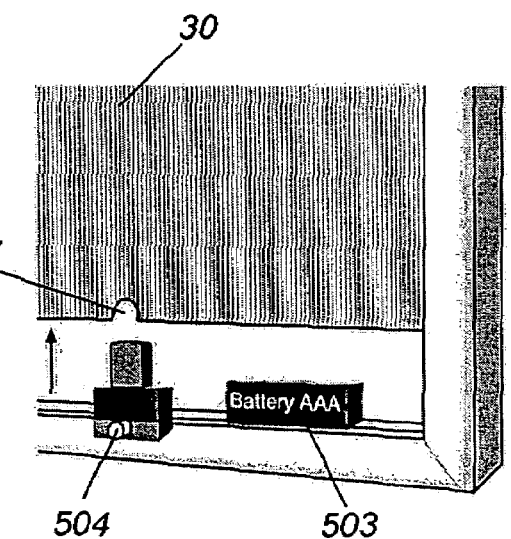
Fig 14  Fig 13

MOTION DISPLAYING PHOTO FRAME

TECHNICAL FIELD

The present invention relates to a kind of displaying photo frame, particularly to an improved, motion displaying photo frame which can reliably and stably display at least two consecutively changing images to be viewed by a viewer.

BACKGROUND ART

In the U.S. Pat. No. 6,219,948 B1 issued to Itzchak Bar-Yona et al has been disclosed a kind of displaying unit which includes a housing having at least one window-like opening; at least one lenticular panel mounted in the housing behind the window-like opening, the lenticular panel having front and rear faces, the local length of the length of the lenses being substantially equal to their width; at least one displaceable, lightweight, substantially planar indicia carrier in the form of a replaceable film or sheet disposed inside the housing; an edge of the indicia carrier at least indirectly freely abutting against a cam; a high efficiency, low-energy consumption, battery powered DC drive including a DC motor complied to the cam for periodically displacing the indicia carrier for a distance at least equaling the distance between two adjacent lenses of the panel; and a guide facilitating smooth reciprocating movement of the indicia carrier in juxtaposition with the rear face of the lenticular panel, whereby displaying the indicia carrier causes the constituent elements of one of the two or more images to be replaced by constituent elements of another one of the two or more images.

Although the above-mentioned unit can continuously display two or more images of the indicia carrier, the change of the images is achieved by the up and down movement of indicia carrier actuated by a motor or cam. This display unit, not only has the drawback of complicated structure, but also its transmission or drive requires balance weight to match the cam, and although the indicia carrier is made of a lightweight paper, it must be flat and straight, in addition a paper is liable to be affected with damp, which will cause the paper to be deformed, thereby the movement speed will be seriously affected. And the indicia carrier cannot be operated properly, resulting in the fact that the images cannot be precisely displayed and even leading to the superposition of the images. In order to overcome the problems occurring in the indicia carrier, a scheme has been proposed to stick or print images on a film or plastic plate. But this method is not only expensive in price, but also, in the processing, the images are easy to have torsions or to lose the finest details of images.

SUMMARY OF THE INVENTION

The aim of the present invention is to provide a motion displaying photo frame by driving the lenticular raster to reliably and stably displaying at least two consecutively changing images.

The scheme to achieve the above-mentioned aim is:

A motion displaying photo frame, it includes:

a frame having a rear plate, an insertion groove is arranged respectively on the inner wall of the frame bars of its two sides;

a lenticular raster formed by a plurality of linear lenses, a first opening is provided on the lower portion near the lower edge, the lenticular raster can be mounted in the frame by means of the insertion grooves therein and can be moved up and downward;

a photo paper, on which constituent images are printed, it can be inserted into frame by means of the insertion grooves and is fixedly located between the lenticular raster and the rear plate.

A drive means, which includes a motor, a gearbox, a battery an an eccentric wheel mounted on the output shaft of the gearbox, the said drive means is mounted on the rear lower portion of the frame, and the eccentric wheel enters into the first opening of the lenticular raster.

A kind of motion displaying photo frame, characterized in that it comprises:

a frame, which frame is formed by assembling the four frame bars by means of the fasteners, an insertion groove is provided respectively in the inner will of all four frame bar;

a rear plate, which rear plate is mounted in the frame by means of inserting it into the insertion groove;

a lenticular raster, which is made of a plurality of linear lenses, a notch is provided in its lower edge, the lenticular raster is mounted in the frame by inserting in the insertion groove and the lenticluar raster can be moved left and rightward;

a photo paper in which are printed constituent images, the photo paper can be inserted into the frame and fixedly situated between the lenticular raster and the rear plate;

a drive means, which includes a motor, a gearbox, a battery and an eccentric wheel mounted on the output shaft of the gear box;

the drive means is mounted on the rear lower portion of the frame, and the eccentric wheel enters into the notch of the lenticular raster.

The motion displaying photo frame of the present invention includes a frame, a lenticular raster. The frame is formed by a number of linear lenses and an opening or a notch is provided on its lower portion. The lenticular raster can move up-down or left to right in the frame through a groove for insertion, the photo paper on which the constituent images and printed can be inserted into frame through insertion grooves and can be fixedly located between the lenticular raster and the rear plate. A drive means having an eccentric wheel is mounted behind the frame. The eccentric wheel can be inserted into the opening or notch of the lenticular raster and the raster can be moved up and down or left to right through the actuation of a motor. Because the photo paper to be made of special paper, film or plastic plate and the lenticular raster can be kept more close to the photo paper, each picture of the two or more constituent images can be finely viewed, as compared with the conventional displaying paper, the clarity or definition is apparently improved.

The motion displaying photo frame is mainly used in individualized design. It can be either used as individualized photo frame with motional effect or used for advertisement with canging characters and images to achieve the visual effect for attracting the viewers.

BRIEF DESCRIPTION OF THE ACCOMPANYING DRAWINGS

FIG. 5 is the front view of FIG. 2 with the top frame portion and the bottom frame portion with mounted front plate being disassembled.

FIG. 6 is a rear view of the drive means in FIG. 2.

FIG. 7 is a view of FIG. 2, with the front plate is disassembled from the bottom frame portion.

FIG. 12 is a sectional view of the second embodiment of the present invention after being assembled.

FIG. 13 is a partial enlarged view of the drive means in FIG. 12.

FIG. 14 is a partial perspective exploded view of the parts on the frame upper portion in FIG. 10.

FIG. 15 is a partial perspective and sectional view of the parts on the lower portion of the frame in FIG. 10.

THE DETAILED DESCRIPTION OF THE EMBODIMENTS

Figure 1:
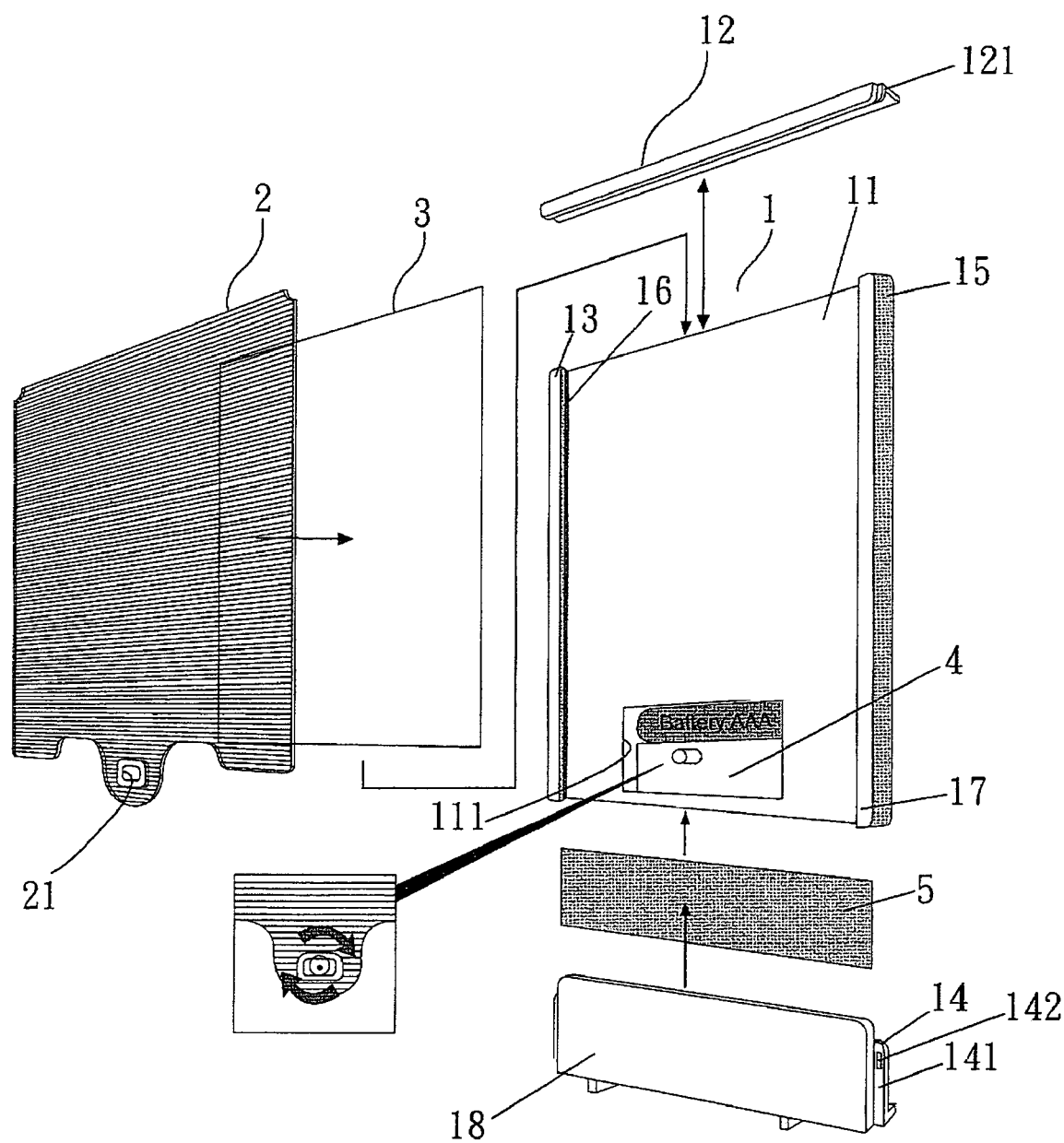
FIG. 1 is a perspective exploded view of the part of the first embodiment of the present invention.
Figure 2:
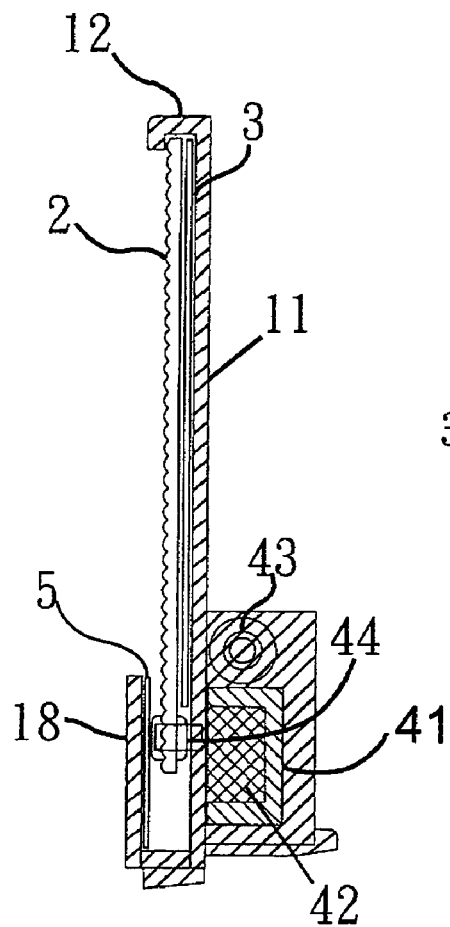
FIG. 2 is a sectional view of the assembled displaying photo unit with motional effect of the first embodiment of the present invention.
Figure 3:
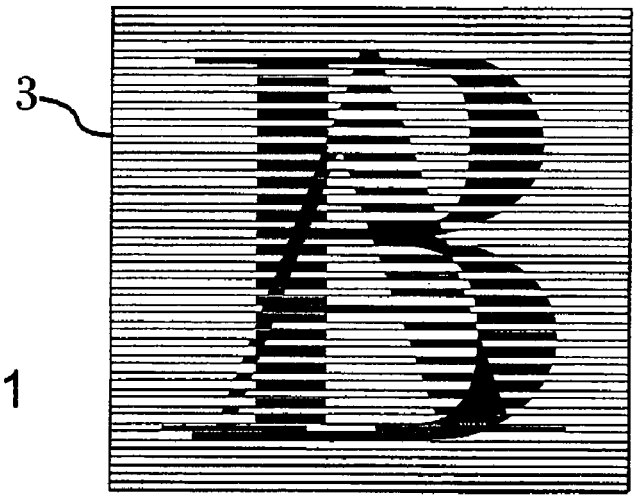
FIG. 3 is the elevational view of the photo paper in FIG. 2.
Figure 4:
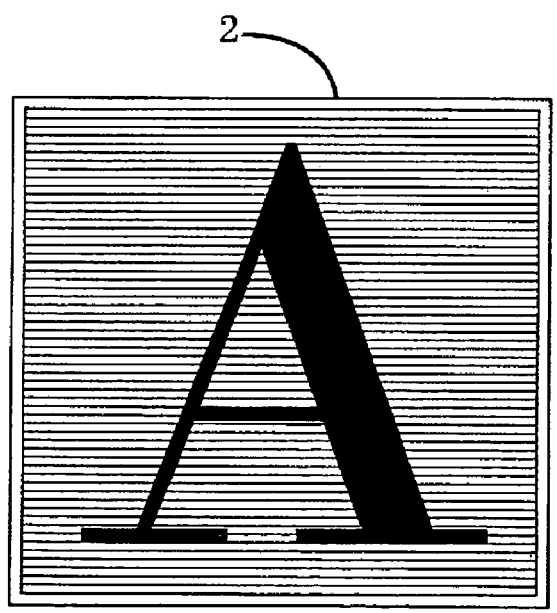
FIG. 4 is the elevational view of the lenticular raster in FIG. 2.

Please refer to FIG. 1 to FIG. 7, in which a motion displaying photo frame of the first embodiment of the present invention is shown. The photo frame includes a frame 1 having a rear plate 11, a lenticular raster 2, a photo paper 3, a drive means 4. The frame 1 is usually a quadrangle photo frame formed by four frame bars 12,13,14,15. A vertical extending portion 16,17 is respectively arranged on the inner walls of the side frame bar 13,15, an insertion groove is formed between the vertical extending portion and the surface of the rear plate 2. A front opening defined by the frame bars in the frontal portion of the frame 1 is used as displaying window of the frame. The frame 1 and the rear plate 11 can be independent elements which are assembled together afterwards, but in the present embodiment they are made of plastic material and are integrated as a whole through the mould pressing. In addition, a second opening 111 can be selectively arranged on the lower portion of the rear plate 11. Preferably, the top frame bar 12 can be formed in a detachable manner, an insertion portion 121 which can be engaged in the insertion groove is respectively provided on the two ends in its length direction.

Most preferably, the bottom frame bar 14 is also formed in a detachable manner, this bottom frame bar 14 is a L-shaped plate. An insertion portion 141 which can be engaged with the insertion groove is respectively provided on its two ends in the length direction. A recess portion 143 is provided in the vertical plate portion to accommodate the lower of the lenticular raster 2.

The frame 1 further includes a front plate 18, on the two sides of the rear surface of the front plate 18 are respectively arranged one or more small and short post-like protruding members 181. Correspondingly the two sides of the L-shaped plate 14 are each disposed small holes 142. The number of which corresponds to small and short post-like protruding head 181 of the front plate 18. Thus the front plate 18 can be mounted on the L-shaped panel 14 and located in front of L-shaped panel 14 through the engagement of the small and short post-like protruding head 181 with the small holes(not shown) of the bottom frame bar. Preferably, three edges of the inner faces of the front plate 18 have each a raised edge portion and three edge closings are formed through keeping close of the raised edge portions to the surface of L-shaped plate 14, and the upper portion is an open structure. There is a gap between the front plate 18 and the L-shaped plate 14, so that an other photo paper 5 can be inserted in the gap through the open upper portion. The paper 5 is ordinary photo paper on which characters and/or images are printed.

The lenticluar raster 2 is formed by a plurality of linear lenses in a conventional manner and an array of lenses is formed. The section of which has the geometry of round column and includes a number of circular arc portions with a predetermined width and radius of curvature, and the rear surface of which is flat. A first opening 21 is disposed on the lower portion near its lower edge. Preferably, the first opening is a rectangular opening. The lenticular raster 2 can be mounted in the frame 1 through the insertion groove of the frame 1 and can be moved up and downward.

On the photo paper 3 are printed constituent images, for example, through the software, 2-8 constituent images can be put together with equal distance and printed on an ordinary paper. In order to properly display images, the total width of the images should be equal to the width of the lenticular raster 2. The photo paper 3 can be inserted in frame 1 through insertion groove of the frame 1 and fixedly located between the lenticular raster 2 and the rear plate 11 and should be kept as close as possible to the rear surface of the lenticular raster 2 so as to displaying precisely every picture.

The drive means 4 includes a motor 41 (not shown), a gearbox 42, a battery 43, and an eccentric wheel 44 mounted on the output shaft of the gearbox. DC motor or step motor can be used for the motor 41 of the drive means. The gearbox 42 is a speed reduction gearbox formed by a number of transmission gears 46. The output rotation speed of the motor, after the gearbox 42, is 2-4 revolutions per minute. Battery 43 uses 1 AAA or 1 AA battery. The battery can last one month under the continuous operation of 24 hours each day. Preferably, the diameter ratio of the smallest diameter R1 to the largest diameter R2 of the eccentric wheel 44 is 1:1.95. In the present embodiment, the diameter of the eccentric wheel 44 will select 4-4.8 mm according to the sizes of the images.

The drive means 4 is mounted on the rear lower portion of the frame 1, said eccentric wheel 44 passes through the second opening 111 of the rear portion 11 and enter the first opening 21 of the lenticular raster 2. The drive means further includes a mounting box 45 in which the motor 41, gearbox 42 and the battery 43 can be mounted. To facilitate the assembly of the drive means 4 on the rear portion of the frame.

Figure 8A:
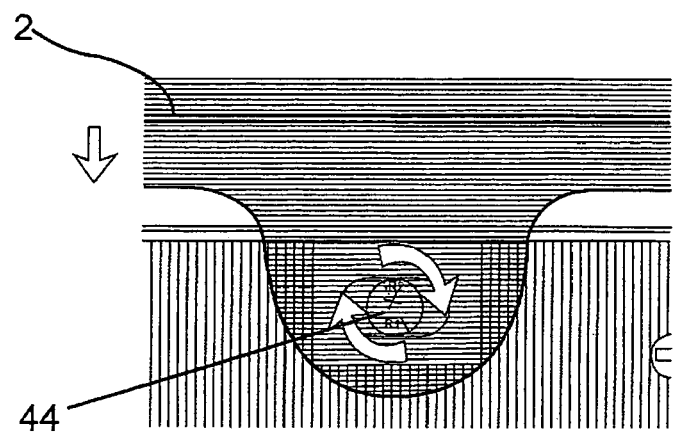
FIGS. 8a and 8b are respectively the views showing the lenticular raster is moving downward and upward by the cam.
Figure 8B:
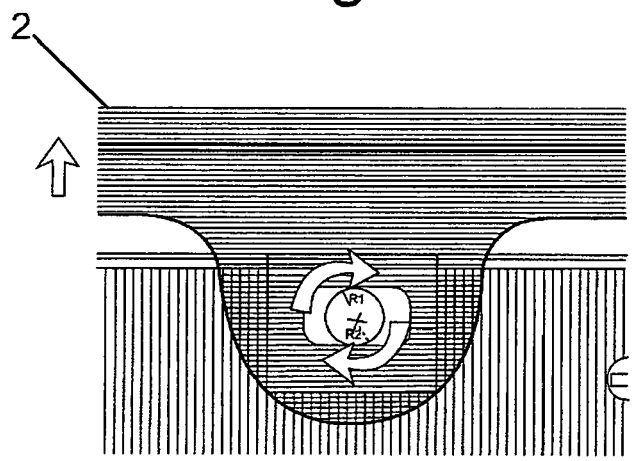
Figures 9A, 9B:
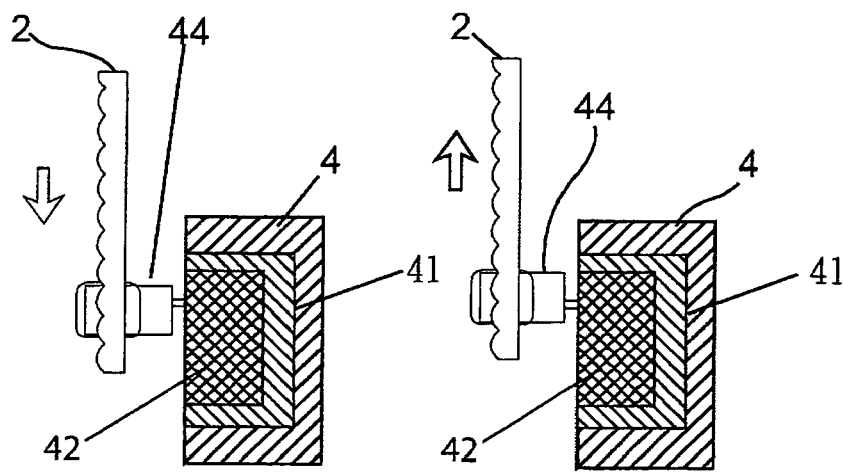
FIGS. 9a and 9b are respectively the side views of FIG. 8a and FIG. 8b.
Figure 10:
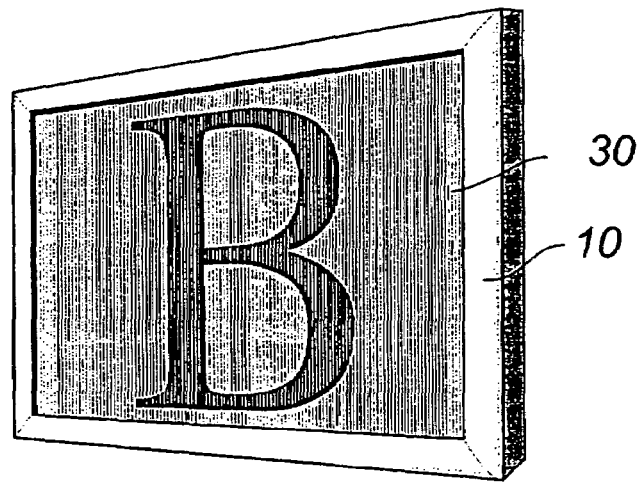
FIG. 10 is a perspective view of the second embodiment after being assembled.
Figure 11:
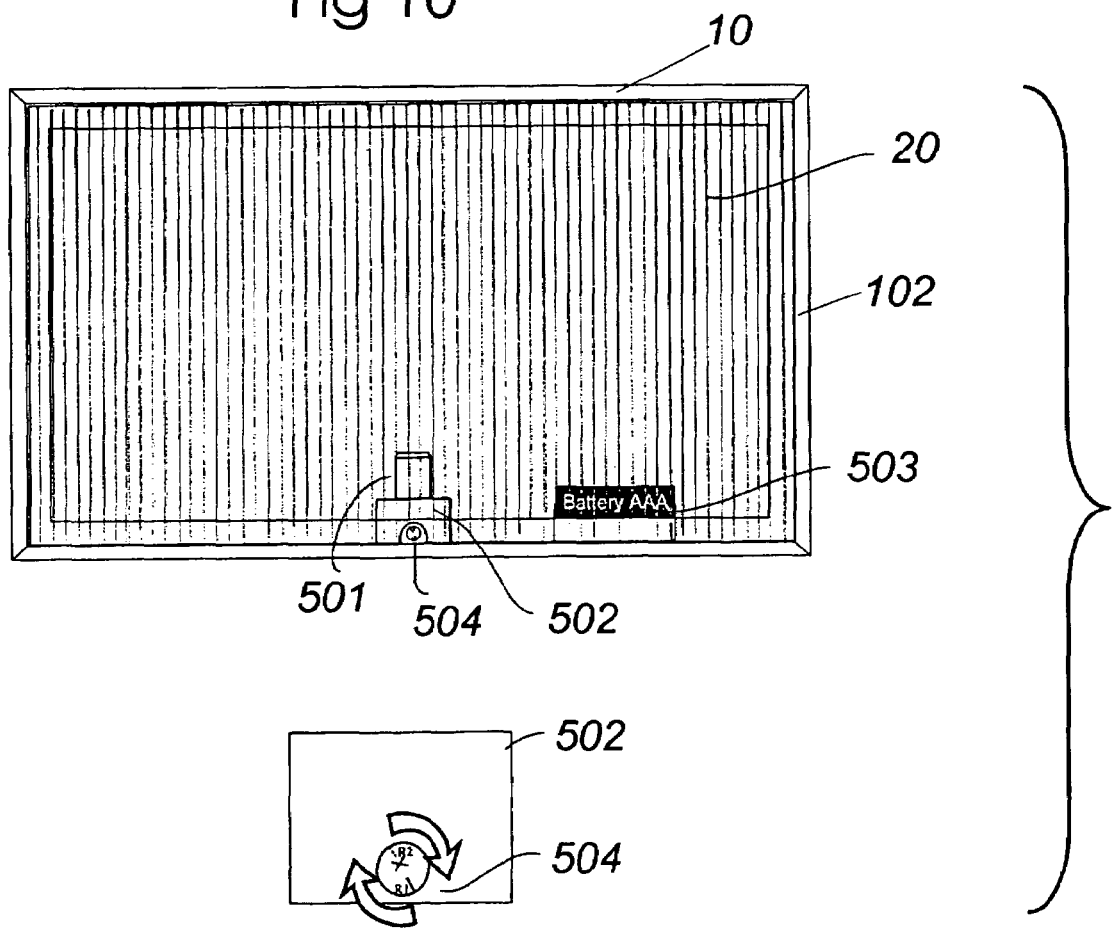
FIG. 11 is a rear view of FIG. 10.

Please refer to FIG. 8a and FIG. 9b, in FIG. 8a-FIG. 9a, the state when the eccentric wheel 44 moves the lenticular raster downward is shown, in FIG. 8b-FIG. 9b, the state when eccentric wheel 44 moves the lenticluar raster upward is shown.

In the present embodiment, frame 1, rear plate 11, top, bottom frame bar 12,14 and the front plate 18 are all made of plastic material.

Please refer to FIG. 10-15, in which a motion displaying photo frame of the second embodiment of the present invention is shown. It includes a frame 10, a rear plate 20, a lenticular raster 30, a photo paper 40 and a drive means 50. Wherein, the frame 10 is formed by four frame bars with insertion groove and is assembled through fasteners. Preferably the frame bars are made of material of speciaL-shaped structure material, for example metallic material or plastic material. In the present embodiment, the frame bars are made of aluminium alloy through pressing process. The frame bars after pressing and lengthening, have a front portion 103 with insertion groove and a hollow rear portion 104. The quadrangle frame is formed by said frame bars by means of right angle plug-in members 103 and screw 104.

Preferably the rear plate 20 is made of glass or plastic plate. An opening or notch 201 is disposed on the lower portion of the rear plate 20. The rear plate 20 is fixedly mounted in frame 10 through insertion groove.

The formation manner of the lenticular raster 30 and images of the photo paper 4 is substantially equal to or the same with the first embodiment. It will not be repeated here. A notch 301 is provided on the lower edge of the lenticular raster 30. Preferably, the notch 301 of the lenticular raster is a circular arc shaped groove. The lenticluar raster 30 can be mounted in frame 10 and can be moved left and right by the aid of the insertion groove of the frame 10. In order to make the lenticular raster 30 be freely moved left and rightward and not be exposed from the left and right frame bars the multiple lenses of lenticular raster 30 are perpendicular to the bottom frame bare of the frame, its length should be slightly smaller than the distance between the insertion groove bottoms of the left and right frame bars, or at least less than the distance between the insertion groove bottom of the left and right frame bars by the width of a lens of the lenticular raster.

The photo paper 40 can be inserted into frame by the aid of insertion grooves of the frame 10, and should be fixed or kept close in between the lenticular raster and the rear plate. Of course, after the lenses of the lenticular raster 30 are arranged perpendicular to bottom frame bar, the constituent images of the photo paper should be changed from the horizontal arrangement direction to the vertical arrangement direction.

The drive means 50 includes a motor 501, a gear box 502, a battery 503 and an eccentric wheel 504 mounted on an output shaft of the gearbox. The motor 501, gearbox 502 and battery 503 are mounted on the rear lower portion of the frame 10, the eccentric wheel 504 will pass through the opening or notch groove 201 of the lower portion of the rear plate 20 to insert into the notch 310 of the lenticular raster 30.

Now please refer to FIG. 12-FIG. 13. The diameter of the eccentric wheel 504 is 4-8 mm. The ratio of its smallest diameter R1 to the largest diameter R2 is 1:1.95. The range of the rotation speed of the motor 501 which can be selected, is 2-4 revolutions per minute.

When the motor 501 rotates, the eccentric wheel 44 will drive leftward and rightward reciprocately the lenticular raster 30, that is, will move the lenticular raster 30 leftward and rightward.

What is claimed is:

1. A motion displaying photo frame, comprising:
    a frame having a rear plate, and two side frame bars at opposite sides of the rear plate, each of the two side frame bars having an inner wall on which an insertion groove is arranged;
    a lenticular raster formed by a plurality of linear lenses, and having a first opening on a lower portion thereof near a lower edge thereof, the lenticular raster being received in the insertion groove so as to be mounted in the frame and movable up and down;
    a photo paper on which constituent images are printed, the photo paper being inserted into the frame by means of the insertion grooves and fixedly located between the lenticular raster and the rear plate; and
    a drive means, including a motor, a gearbox, a battery and an eccentric wheel mounted on an output shaft of the gearbox, the drive means being mounted on a rear lower portion of the frame, the eccentric wheel entering into the first opening of the lenticular raster.

2. The motion displaying photo frame according to claim 1, wherein:
    the drive means further includes a mounting box in which the motor, the gearbox, and the battery are mounted;
    a second opening is formed on a lower portion of the rear plate; and
    the eccentric wheel passes through the second opening of the rear plate and is inserted into the first opening of the lenticular raster.

3. The motion displaying photo frame as claimed in claim 1, wherein:
    the frame further includes a detachable top frame bar;
    the top frame bar has two ends in a length direction thereof; and
    each end of the top frame bar has an inserting portion engageable with the insertion groove.

4. The motion displaying photo frame as claimed in claim 1, wherein:
    the frame further includes a detachable bottom frame bar which is an L-shaped plate;
    the bottom frame bar has two ends in a length direction thereof; and
    each end of the bottom frame has an inserting portion engageable with the insertion portion.

5. The motion displaying photo frame as claimed in claim 4, wherein:
    the frame further includes a front plate having a rear surface;
    two sides of the rear surface respectively have one or more short protruding heads;
    the L-shaped plate has, respectively at its two sides, a number of small holes, corresponding to the number of short protruding heads of the front plate; and
    the front plate is mounted in front of the L-shaped plate by engaging the short protruding heads with the small holes of the L-shaped plate.

6. The motion displaying photo frame as claimed in claim 5, wherein:
    the front plate has an inner surface;
    three edges of the inner surface respectively have a raised edge portion which is kept close to the L-shaped plate so as to allow the three edges to be closed while an upper open portion is formed at the front plate; and
    between the front plate and the L-shaped plate, there is a gap for inserting another paper in the gap through the upper open portion.

7. The motion displaying photo frame as claimed in claim 1, wherein the eccentric wheel has a ratio of 1:1.95 of the smallest diameter R1 to the largest diameter R2 of the eccentric wheel.

8. The motion displaying photo frame as claimed in claim 1, wherein the first opening of the lenticular raster is a rectangle opening.

9. The motion displaying photo frame as claimed in claim 1, wherein the eccentric wheel has a diameter of 4-4.8 mm.

10. The motion displaying photo frame as claimed in claim 1, wherein the motor has a rotational speed of 2-4 revolutions per minute.

11. The motion displaying photo frame as claimed in claim 1, wherein:

the frame further includes a top frame bar, an L-shaped plate, and a front plate; and the rear plate, the top frame bar, the L-shaped plate and the front plate are all made of plastic materials.

* * * * *